(12) United States Patent
Mangano et al.

(10) Patent No.: US 7,350,437 B2
(45) Date of Patent: Apr. 1, 2008

(54) HANDLEBAR FOR CYCLES AND MOTORCYCLES

(75) Inventors: Antonio Mangano, Turin (IT); Giuseppe Mangano, Turin (IT)

(73) Assignee: Hi-Line S.R.L., Grugliasco (Turin) (IT)

( * ) Notice: Subject to any disclaimer, the term of this patent is extended or adjusted under 35 U.S.C. 154(b) by 434 days.

(21) Appl. No.: 10/895,831

(22) Filed: Jul. 22, 2004

(65) Prior Publication Data

US 2005/0198781 A1  Sep. 15, 2005

(30) Foreign Application Priority Data

Mar. 15, 2004  (EP) ................... 04425173

(51) Int. Cl.
  *B62K 21/12*  (2006.01)
(52) U.S. Cl. .................... 74/551.1
(58) Field of Classification Search .......... 74/551.1, 74/551.4, 551.5, 551.6, 551.8, 551.9, 482, 74/280
  See application file for complete search history.

(56) References Cited

U.S. PATENT DOCUMENTS

| 2,666,340 | A | | 1/1954 | Hunt |
| 5,064,157 | A | | 11/1991 | O'Neal |
| 5,117,708 | A | * | 6/1992 | Boyer et al. ............... 74/551.1 |
| 5,257,552 | A | | 11/1993 | Boyer et al. |
| 5,487,709 | A | | 1/1996 | Froelich, Sr. et al. |
| 5,832,785 | A | * | 11/1998 | Costahaude et al. ....... 74/551.1 |

(Continued)

FOREIGN PATENT DOCUMENTS

| DE | 4323501 | 1/1995 |
| DE | 19851015 | 5/2000 |
| DE | 20102195 | 3/2002 |
| DE | 20304287 | 6/2003 |
| EP | 1362780 | 11/2003 |
| FR | 2148748 | 3/1973 |
| WO | WO 0021824 | 4/2000 |

OTHER PUBLICATIONS

Expert Report of Robert B. Pond, Jr. dated Aug. 30, 2002, submitted in U. S. litigation *Ed Tucker Distributor, Inc., et al., v. 1682P and Renthal Ltd., et al.*, C.A. 3-00-v (N.D. Texas, Dallas) and submitted in priority European patent application No. 04425173.4 as an observation under article 115 EPC.

(Continued)

*Primary Examiner*—Richard Ridley
*Assistant Examiner*—Matthew A. Johnson
(74) *Attorney, Agent, or Firm*—Bacon & Thomas, PLLC

(57) ABSTRACT

A handlebar (11,111,211) for cycles and motorcycles, in particular for cross-country use, which is light but at the same time resistant to high intensity shocks and stresses and having an optimized elasticity. The handlebar has a median section (13,113) which presents a central portion (23) having a diameter $d_{23}$ and a thickness $s_{23}$ for fixing the handlebar; two end sections (15,17), each of them presenting a central portion (27) having a diameter $d_{27}$ and a thickness $s_{27}$ for holding the handlebar; and two intermediate sections (19, 21), each of them presenting a central portion (25) having a diameter $d_{25}$ and a thickness $s_{25}$ linking to the median section (13) in an inner bending zone (24) and to a corresponding one of the end sections (15,17) in an external bending zone (26) having a thickness $s_{26}$. The handlebar has a variable diameter and a variable thickness such that the diameter varies according to the law $d_{23}>d_{25}>d_{27}$ and the thickness of the handlebar varies according to the law $s_{26}>s_{23}>s_{25}>s_{27}$.

14 Claims, 3 Drawing Sheets

U.S. PATENT DOCUMENTS

| | | | |
|---|---|---|---|
| 5,950,497 | A | 9/1999 | Weiher |
| 6,035,742 | A | 3/2000 | Hollingsworth et al. |
| 6,182,528 | B1 * | 2/2001 | Renshaw .................. 74/551.1 |
| 6,421,879 | B1 | 7/2002 | Graetz et al. |
| 6,644,144 | B2 * | 11/2003 | Bedard ...................... 74/551.9 |
| 6,668,681 | B2 * | 12/2003 | Flum et al. ................ 74/551.1 |
| 6,742,795 | B2 * | 6/2004 | Liao .......................... 280/274 |
| 2004/0036194 | A1 | 2/2004 | Chadwick et al. |

OTHER PUBLICATIONS

*MOTOCROSS*, Feb. 2004, Cover page and advertisement for MXA Product Four-One-One (Tag Metals XT1 Handlebar) submitted in priority European patent application No. 04425173.4 as an observation under article 115 EPC.

Renthal Catalogue, date unknown, submitted in priority European patent application No. 04425173.4 as an observation under article 115 EPC.

* cited by examiner

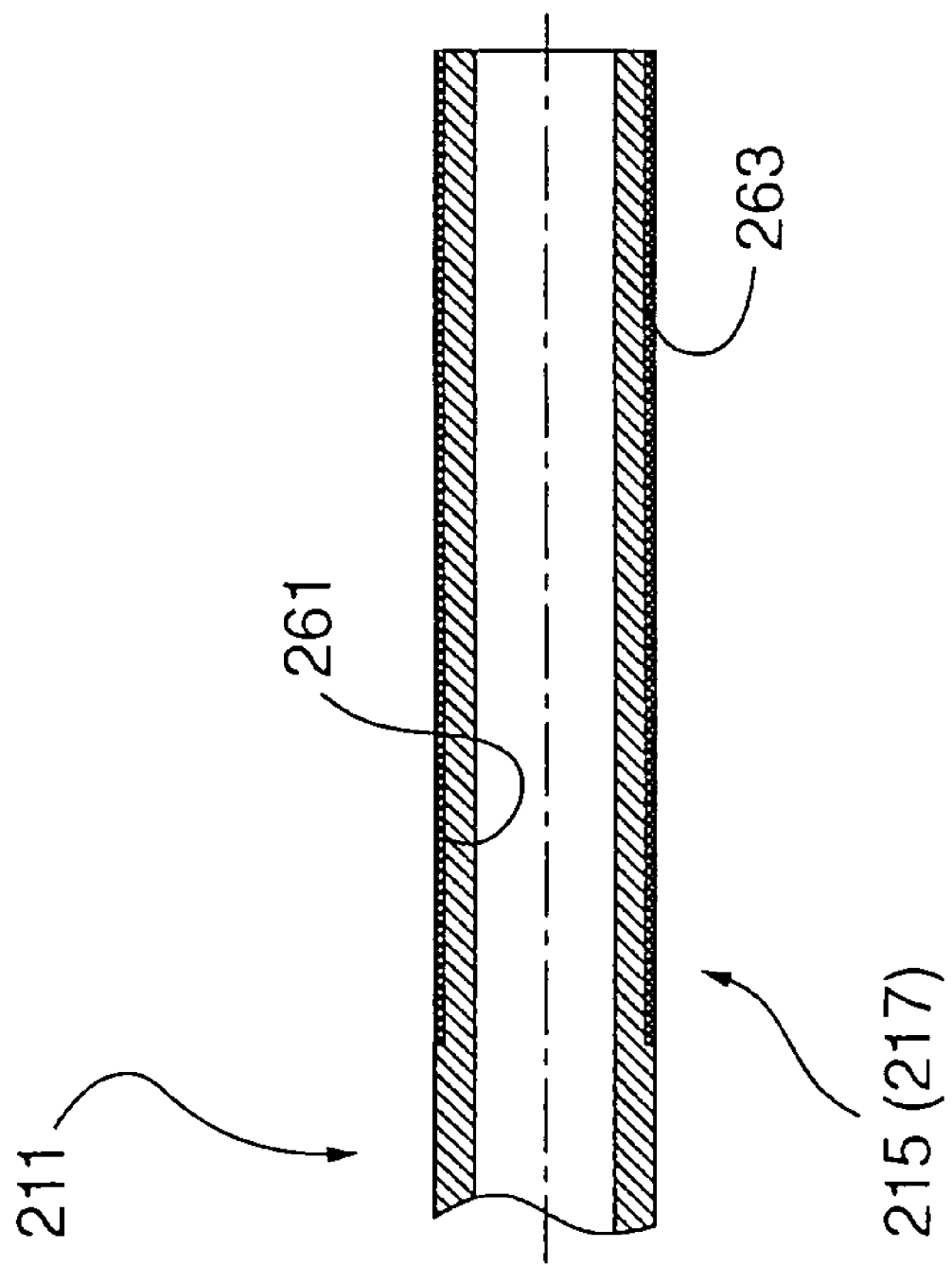

ent. As a consequence,
mud and dirtiness slipping between the throttle control
HANDLEBAR FOR CYCLES AND MOTORCYCLES

BACKGROUND OF THE INVENTION

Field of the Invention

The present invention concerns a handlebar for cycles and motorcycles.

More specifically, the invention concerns a handlebar suitable to two- three- or four-wheels cycles and motorcycles, particularly for cross-country use.

The handlebars for cycles and motorcycles generally consist in a bent-iron tube so as to define a median section for fixing the handlebar to the fork head, said fixing generally occurring by means of an appropriate bracket, of two end sections for holding the handlebar and of two intermediate linking sections.

As it is known, all the components of the frame of cycles and motorcycles for cross-country use must have high resistance as they suffer high intensity shocks and stresses.

It is also known the fact that cycles and motorcycles, and in particular racing cycles and motorcycles, must generally exhibit light construction for improving their performance and their ease of drive.

However, these two needs are often in opposition since the use of lighter materials or of lightened structures can sometimes jeopardise the resistance of the motorcycle's components.

One of the motorcycle's components that during these last years for the above mentioned grounds has undergone lightening interventions is for instance the handlebar.

Recently, particularly light handlebars having a high capability of absorbing vibrations and made of aluminum alloy have been introduced.

However, this type of material presents the inconvenience of being subject to breakage when suffering high stresses, like the stresses occurring during a cross-country race.

In order to solve this inconvenience, handlebars with variable diameter or thickness have been proposed in the past for limiting the weight in the less stressed sections and for increasing the resistance in the sections subject to breakage to a greater extent.

U.S. Pat. No. 5,117,708 describes for instance a strengthened handlebar for motorcycles showing a central section having a greater diameter, two end sections having a standard diameter and two tapered linkage sections.

U.S. Pat. No. 5,257,552 describes a handlebar having variable diameter and thickness wherein the central section exhibits a diameter and a thickness greater than the end sections.

U.S. Pat. No. 5,832,785 describes a handlebar having a constant diameter wherein the thickness is internally increased in the central section.

U.S. Pat. No. 5,950,497 describes a handlebar having variable diameter and constant thickness wherein the diameter of the central section is greater than the diameter of the end sections and wherein the linking sections have a tapered diameter.

The handlebars so realised exhibit two advantages: on the one hand, they exhibit high resistance in the zone of connection to the fork head and, on the other hand, they are easy to manufacture.

However, the handlebars according to the prior art do not completely solve the problems of weight and of elasticity that are particularly important for the racing cycles and motorcycles.

The elasticity of the handlebar is in fact a particularly important aspect as a good elasticity guarantees two advantages: on the one hand, the handlebar turns out to be less subject to sudden yielding (breakage or bending) provoked by the very high loads occurring in case of particularly violent shocks due to jumps or falls; on the other hand, it better absorbs the vibrations and the stresses due to the ground roughness, and stresses, when using a rigid handlebar, being transmitted to the pilot's limbs and making the drive much harder.

On the contrary, a handlebar with the right elasticity makes a hard task lighter and increases the pilot's performance.

The handlebars realised according to the described prior art further exhibit the inconvenience of having a not optimally distributed resistance as they sometimes result to be fragile in correspondence with the zones subject to high loads and therefore more critical zones, while they are excessively strong in less critical zones, said handlebars thereby often resulting excessively heavy.

Moreover, the handlebars so realised are often very thin in correspondence with their ends for limiting their weight and this makes difficult the fixing of accessories for protecting the hands ("hand guards") which are blocked by means of expansion terminals on the handlebar ends, as it is described for instance in U.S. Pat. No. 4,141,567.

On the contrary, it is more and more felt the need of obtaining components for racing cycles and motorcycles having less weight, high shock resistance and good elasticity.

SUMMARY OF THE INVENTION

It is therefore a first object of the present invention to provide for a handlebar for cycles and motorcycles which is light, resistant and elastic.

A further inconvenience of the handlebars made of aluminium alloy according to the prior art is determined by the fact that aluminium is a material which is not suitable to sliding and that can be easily abraded. As a consequence, mud and dirtiness slipping between the throttle control cylindrical tube, that can be made of plastic or metal, and the handlebar can provoke an increase of the friction until the throttle control tube seizes.

A further object of the invention is therefore that of solving the above mentioned problem by providing a handlebar made of aluminium allowing a better working of the throttle control.

The above mentioned objects are obtained by means of a handlebar for cycles and motorcycles as claimed in the hereby attached claims.

Advantageously, according to the invention, the handlebar presents a variable diameter and a variable thickness along the axis of the handlebar according to a law allowing to reach a right compromise between the need of obtaining an high resistance in the zones more subject to stresses and an high elasticity in presence of dynamic stresses, while obtaining at the same time a mass lower than the mass of the handlebars now in commerce.

A further advantage of the invention derives from the fact that it is possible to obtain a further straightened version of the handlebar thanks to the possibility of mounting a strengthening crossbar anchored to the intermediate linking sections or by means of two clamps presenting an inverse taper with respect to the taper of the handlebar in the fixing zone, or by defining on the handlebar corresponding cylindrical portions in said intermediate linking sections in order to simplify the fixing of the clamp.

A further advantage of the invention is obtained by providing at one end an insertion made of a material more suitable than aluminium to slide on surfaces like the throttle control tube.

BRIEF DESCRIPTION OF THE DRAWINGS

Some illustrative and non-limitative embodiments of the invention will be now described with reference to the hereby attached figures wherein:

FIG. 4 is a sectional view of a particular of the handlebar according to a third embodiment of the invention.

DETAILED DESCRIPTION

Figure 1:
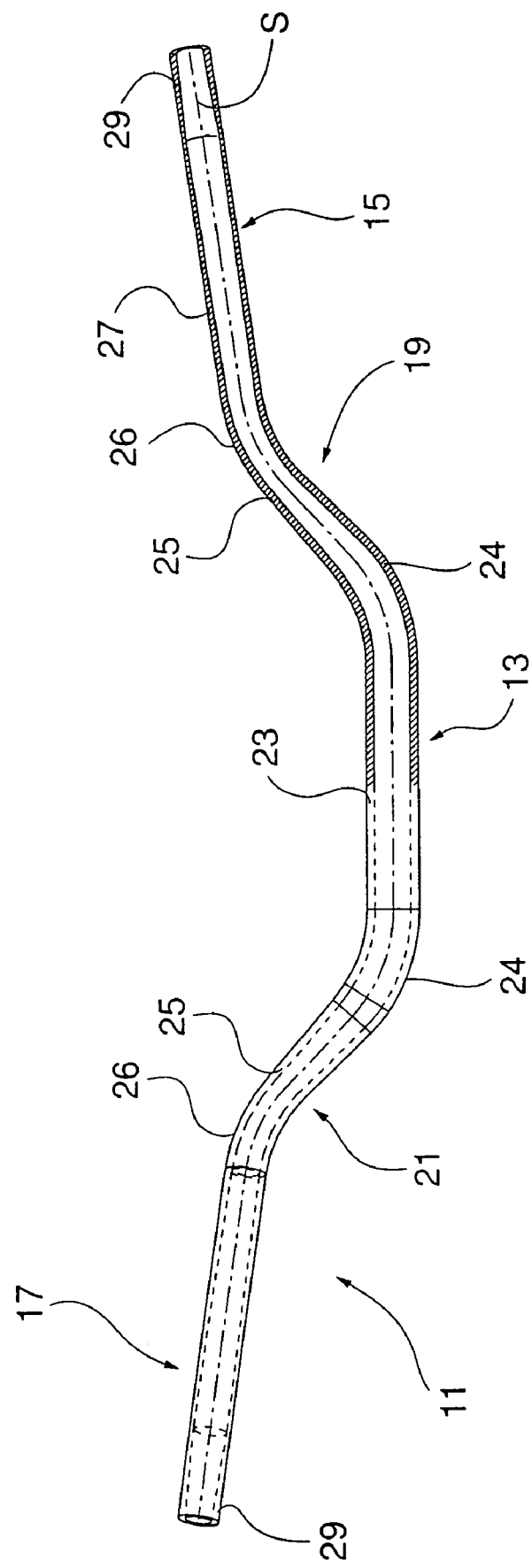
FIG. 1 is a sectional front view of the handlebar according to a first embodiment of the invention.

With reference to FIG. 1, it is shown a handlebar 11 realised according to a first embodiment of the invention.

Said handlebar 11 is obtained by a bent tube, preferably made of aluminium alloy and having circular cross-section, and comprises a median section 13 for fixing the handlebar 11 at the vehicle's fork head, two end sections 15,17 for holding the handlebar and two intermediate sections 19,21 for linking the central section 13 and the two end sections 15,17.

According to the invention, both the diameter and the thickness of the handlebar 11 vary along the longitudinal axis S of the handlebar in order to define a portion 23 of the diameter $d_{23}$ and thickness $s_{23}$ at the center of the median section 13 and comprising inner bending zones 24, a portion 25 substantially at the center of the intermediate sections 19,21 having a diameter $d_{25}$ and a thickness $s_{25}$, a portion 26 corresponding respectively to the external bending zones and having a diameter $d_{26}$ and a thickness $s_{26}$, a portion 27 at the center of the end sections 15,17 having a diameter $d_{27}$ and a thickness $s_{27}$, and a portion 29 at the free end of said end sections 15,17 having a diameter $d_{29}$ and a thickness $s_{29}$ and length of about 50 mm.

According to this first embodiment of the invention, the diameter of the handlebar varies according to the following law:

$$d_{23} > d_{25} > d_{27}$$

and the thickness of the handlebar varies according to the following law:

$$s_{26} > s_{23} > s_{25} > s_{29} > s_{27},$$

wherein preferably $d_{29} \cong d_{27}$.

Moreover, the two intermediate linking sections 19,21 are tapered and exhibit a diameter continuously decreasing as one moves away from the central section 13 towards the corresponding end sections 15,17.

In one embodiment of the handlebar according to the invention, the bent tube exhibits a diameter $d_{23}$ of about 28 mm and a diameter $d_{27}$ of about 22 mm, the diameter $d_{25}$ being intermediate between said two values.

Always according to said embodiment, the bent tube exhibits a thickness $s_{26} \cong 5.2$ mm, $s_{23} \cong 4.5$ mm, $s_{25} \cong 4.2$ mm, $s_{29} \cong 4.0$ mm and $s_{27} \cong 2.8$ mm.

Advantageously, according to the invention, the diameter and the thickness of the tube, according to which the handlebar 11 varies, is realised so as to obtain on the one hand greater robustness in the critical points and, on the other hand, optimal elasticity and lightness.

In fact, the zones wherein the stresses are more concentrated, and therefore the zones more subject to yielding due to breakage or permanent buckling, are the zones in correspondence with the fork actuating plate and the zones corresponding to the bendings of the handlebar. Besides, these latter zones, given their geometry and because of the weakening due to the stress of the material during the bending, often turn out to be less resistant with respect to the remaining parts of the handlebar and therefore need to have an appropriate thickness.

Thanks to the diameter and thickness variation according to what has been described, it is possible to optimize the behavior of the handlebar while maintaining a high resistance in the bending and actuating zones. In particular, in the external bending zones shown in FIG. 1 with the reference 26 the weakening due to the reduced diameter is counterbalanced by the increase of the thickness. In fact, in these zones the thickness of the material results to be greater than the remaining parts of the handlebar.

Always according to the invention, the handlebar 11 advantageously comprises a portion 29 of increased thickness (about 4.0 mm) in correspondence with the free ends of the handlebar, for about 50 mm in extension, for fixing expansion inserts, for instance for fixing hand guards.

The handlebar so obtained optimises resistance to buckling, elasticity and lightness. In particular, the resistance is varied as a function of the stresses to which the handlebar is subject in the different sections during the use, so as not to uselessly increase the weight of the handlebar in little stressed zones and to maintain an high resistance in the zones subject to stresses to a greater extent. In this way, even by maintaining the handlebar light, there are obtained greater flexibility and elasticity with respect to the known handlebars and optimal absorption of those shocks due to the ground roughness, to the jumps and to the falls, that are typical of the cross-country use of cycles and motorcycles.

Figure 2:
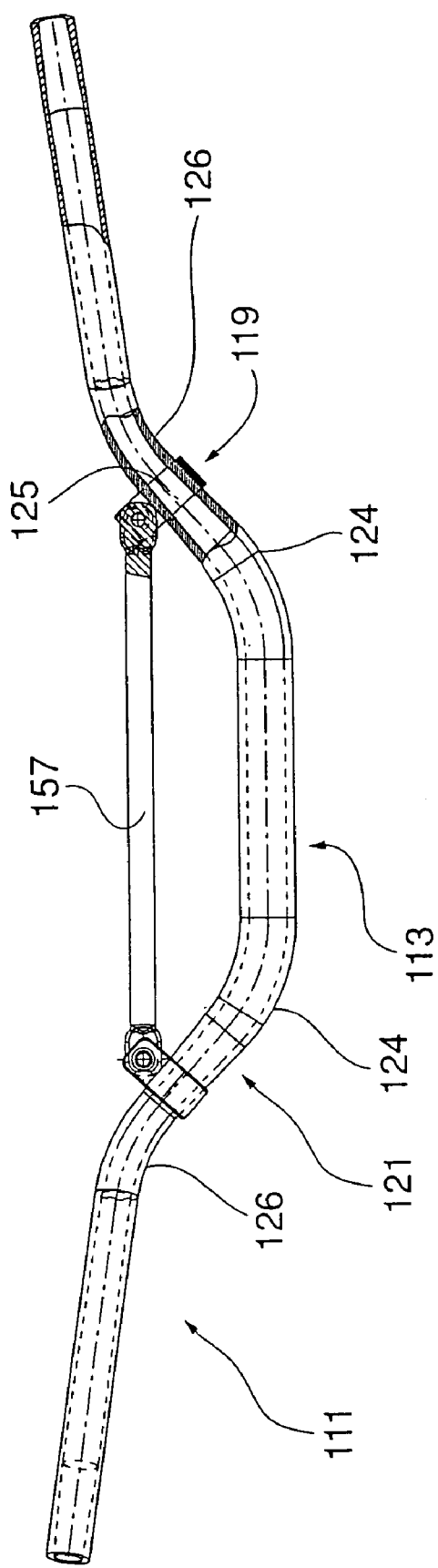
FIG. 2 is a sectional front view of the handlebar according to a second embodiment of the invention.
Figure 3:
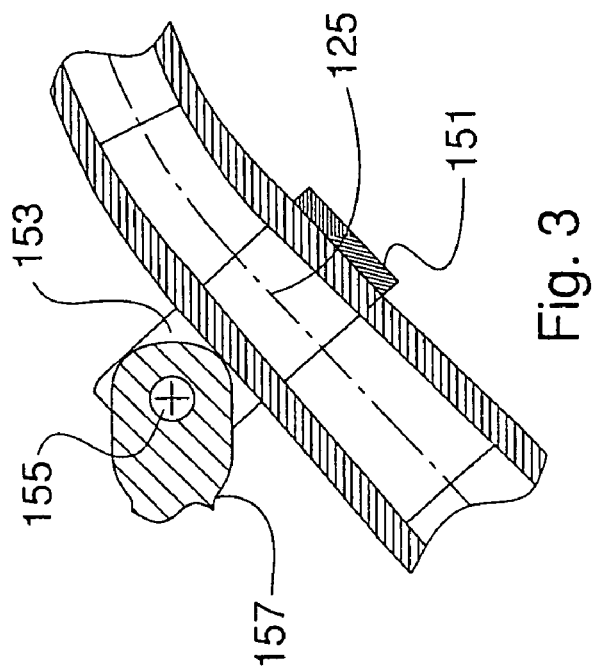
FIG. 3 is an enlarged view of a particular of the handlebar of FIG. 2.

With reference now to the FIGS. 2 and 3, it is described a handlebar 111 realised according to two variants of a second embodiment of the invention.

The handlebar 111 exhibits a portion 125 substantially at the centre of each intermediate section 119,121 to which it is fixed a clamp 151 provided with a bracket 153 and with a fixing element, for instance a screw or a bolt 155, for fixing a transversal strengthening bar or crossbar 157 arranged substantially parallel to the central section 113.

Since said portion 125 is conical and presents a diameter decreasing as one moves away from the central section 113, the clamp 151 correspondingly presents an internal section with complementary taper in order to adapt itself to the taper of said central portion 125.

Alternatively, according to a variant of said second embodiment of the invention, it is provided that said central portion 125 is realised cylindrical. Advantageously, in this way said portion 125, being cylindrical at constant diameter, constitutes a zone suitable for fixing a clamp 151 of standard type with an inner section which is also cylindrical. In this case, the intermediate sections 119,121 will exhibit two conical sections at their ends, that link themselves from the one side to the cylindrical portion 125 and to the other side to the inner 124 and external 126 bending zones respectively. The cylindrical portion 125 will be in this way comprised between the two conical sections.

The handlebar according to this embodiment of the invention, thus having variable thickness and diameter and provided with a crossbar 157, turns out to be particularly suitable to be employed in protracted hard conditions and in all those cases where it is necessary a support to which steadily anchor auxiliary instruments like for instance the instruments necessary during the motorcycle rallies.

With reference to FIG. 4, it is described a handlebar 211, realised according to a third embodiment of the invention.

Said handlebar 211, made of aluminium, is provided in at least one of the end sections 215,217 with a cylindrical seat 261, defined through a section having a lower diameter for inserting a sleeve 263, made of hard material, preferably of stainless steel or of composite material.

Said sleeve exhibits a thickness substantially equal to the depth of said seat 261 so that the handlebar 211 results without steps on the external surface of said end section provided with a seat 261.

In the shown example said sleeve 263 exhibits a length of about 100 mm.

Advantageously, according to this variant of embodiment of the invention, it is possible to obtain handlebars made of aluminium alloy and consequently very light, suitable for mounting the throttle control, which do not exhibit the inconvenience due to the higher friction of the throttle tube, generally made of plastic or sometimes of aluminium, against the surface made of aluminium of the handlebar. The hard surface of the sleeve 263 is in fact less subject to the abrasions provoked by the dirtiness and mud slipping between the throttle tube and handlebar during the rotation of said tube when the throttle control is used and therefore the rotation of the throttle control results to be fluid to a greater extent.

The invention claimed is:

1. Handlebar for cycles and motorcycles comprising a bent tube so as to define:
   a median section presenting a central portion having a diameter $d_{23}$ and a thickness $s_{23}$ for fixing the handlebar;
   two end sections for holding the handle bar, each end section having a central portion having a diameter $d_{27}$ and a thickness $s_{27}$; and
   two intermediate sections, each intermediate section having a central portion linking to said median section in an internal bending zone and to a respective one of said end sections in an external bending zone, said external bending zone having a thickness $s_{26}$ and each central portion having a diameter $d_{25}$ and a thickness $s_{25}$;
   said handlebar presenting variable diameter and thickness, wherein said diameter varies according to the following law:

$d_{23} > d_{25} > d_{27}$ and the thickness of the handlebar varies according to the following law:

$s_{26} > s_{23} > s_{25} > s_{27}$.

2. Handlebar for cycles and motorcycles according to claim 1, wherein said end sections comprise a corresponding free end portion having a diameter $d_{29}$ and a thickness $s_{29}$ and wherein $s_{25} > s_{29} > s_{27}$ and $d_{29}$ is approximately equal to $d_{27}$.

3. Handlebar for cycles and motorcycles according to claim 2, wherein said two intermediate sections are tapered and exhibit a diameter continuously decreasing from the median section towards the corresponding end sections.

4. Handlebar for cycles and motorcycles according to claim 3, wherein s26 is about 5.2 mm, s23 is about 4.5 mm, s25 is about 4.2 mm, s29 is about 4.0 mm, and s27 is about 2.8 mm.

5. Handlebar for cycles and motorcycles according to claim 2, wherein said diameter $d_{23}$ is about 28 mm and said diameter $d_{27}$ is about 22 mm, the diameter $d_{25}$ being intermediate between said two values.

6. Handlebar for cycles and motorcycles according to claim 1, wherein each of said intermediate sections comprises a cylindrical portion having a constant diameter substantially at the center of each intermediate section, wherein the cylindrical portion is configured for fixing a clamp having a cylindrical inner section.

7. Handlebar for cycles and motorcycles according to claim 6, further comprising:
   a crossbar arranged substantially parallel to the median section; and
   a clamp having a cylindrical inner section and fixed to one of said cylindrical portions having a constant diameter substantially at the center of each intermediate section, said clamp being provided with a bracket and with a fixing element to which the crossbar is fixed.

8. Handlebar for cycles and motorcycles according to claim 1, wherein each of said intermediate sections comprises a conical portion substantially at the center of each intermediate section, the diameter of said conical portion decreasing as one moves away from said median section, wherein each intermediate section is configured for fixing a clamp having a conical inner section complementary to the inner section of said conical portion.

9. Handlebar for cycles and motorcycles according to claim 8, further comprising:
   a crossbar arranged substantially parallel to the median section; and
   a clamp having a conical inner section complementary to said conical portion, said clamp being provided with a bracket and with a fixing element to which the crossbar is fixed.

10. Handlebar for cycles and motorcycles according to claim 1, wherein said handlebar is provided in at least one of the end sections with a cylindrical seat, defined by a section having a reduced diameter, wherein the end section is configured for inserting a sleeve for assuring easier sliding of the throttle control.

11. Handlebar for cycles and motorcycles according to claim 10, further comprising a sleeve inserted on said cylindrical seat for assuring easier sliding of the throttle control.

12. Handlebar for cycles and motorcycles according to claim 11, wherein said sleeve exhibits a thickness substantially equal to the depth of said cylindrical seat so that the handlebar is without steps on the external surface of said end section provided with said cylindrical seat.

13. Handlebar for cycles and motorcycles according to claim 12, wherein said sleeve exhibits a length of about 100 mm.

14. Handlebar for cycles and motorcycles according to claim 1, wherein said handlebar is made of aluminum alloy.

* * * * *